3 Sheets—Sheet 1.

B. B. HOTCHKISS.

MACHINE OR BATTERY GUNS.

No. 7,881. Reissued Sept. 11, 1877.

Witnesses:

Geo. H. Graham.

Louis H. Todd.

Inventor

B. B. Hotchkiss, by Munson & Philipp

Attorneys.

3 Sheets—Sheet 2.

B. B. HOTCHKISS.

MACHINE OR BATTERY GUNS.

No. 7,881. Reissued Sept. 11, 1877.

Witnesses;

Geo. H. Graham.

Louis H. Toes

Inventor;

B. B. Hotchkiss.

by Munson & Philipp

Attorneys.

3 Sheets—Sheet 3.
B. B. HOTCHKISS.
MACHINE OR BATTERY GUNS.
No. 7,881. *Fig. 6.* Reissued Sept. 11, 1877.
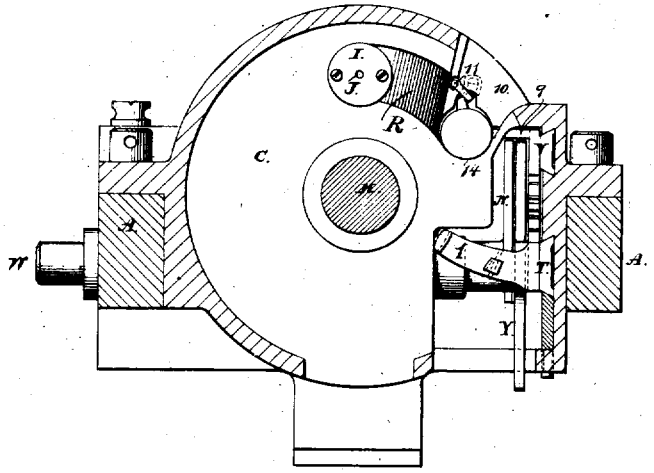
*Fig. 7.*
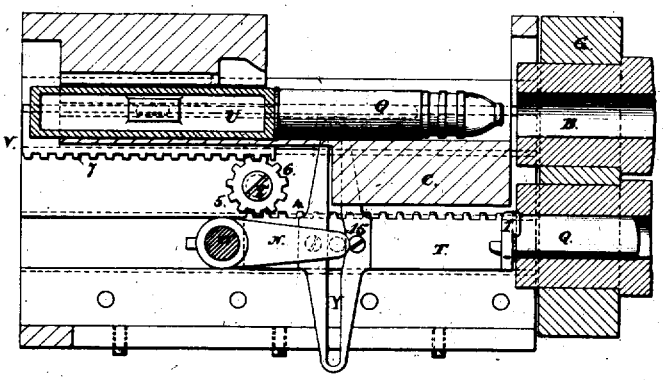
*Fig. 8.*
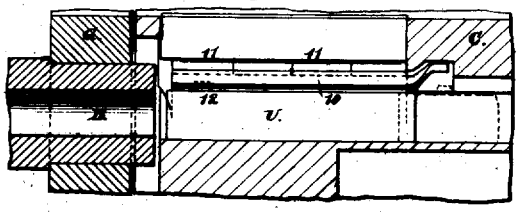
*Fig. 9.*
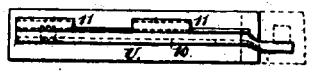
*Witnesses:*
Geo. H. Graham.
Louis H. Todd
*Inventor:*
B. B. Hotchkiss,
by Munn & Philipp
Attorneys.

UNITED STATES PATENT OFFICE.

BENJAMIN B. HOTCHKISS, OF NEW YORK, N. Y.

IMPROVEMENT IN MACHINE OR BATTERY GUNS.

Specification forming part of Letters Patent No. 130,501, dated August 13, 1872; Reissue No. 7,881, dated September 11, 1877; application filed January 31, 1877.

*To all whom it may concern:*

Be it known that I, B. B. HOTCHKISS, of the city, county, and State of New York, now temporarily residing in Paris, France, have invented certain Improvements in Revolving or Repeating Guns, of which the following is a specification:

The improvement is intended for use with projectiles of a moderate size, something larger than the ordinary projectiles which are discharged from pieces held to the shoulder. It may be used with projectiles of larger or smaller diameter, and with barrels either rifled or smooth. In distinction from those arms which are held in the hand, as pistols, and those which are held to the shoulder, as muskets, it may be termed a "revolving cannon." Many previous attempts have been made to produce such, but my invention involves important improvements over those heretofore constructed.

The following is a description of an advantageous means of carrying out the invention:

The accompanying drawing forms a part of this specification, and represents a series of six barrels, capable of revolving around a central axis which extends along between them.

Figure 1:
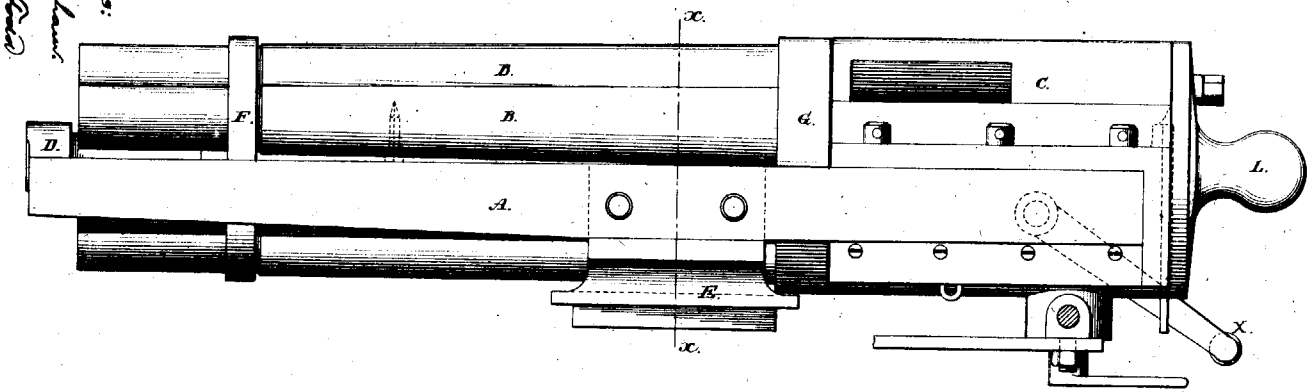
Figure 2:
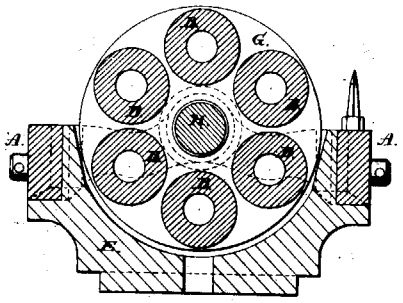
Figure 3:
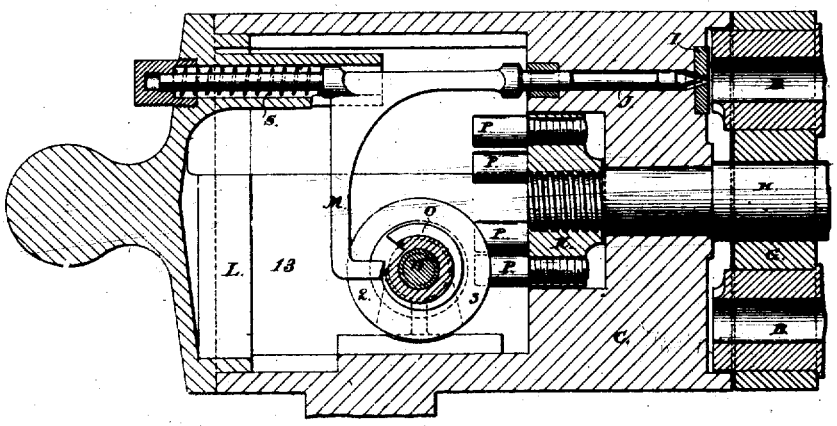
Figure 4:
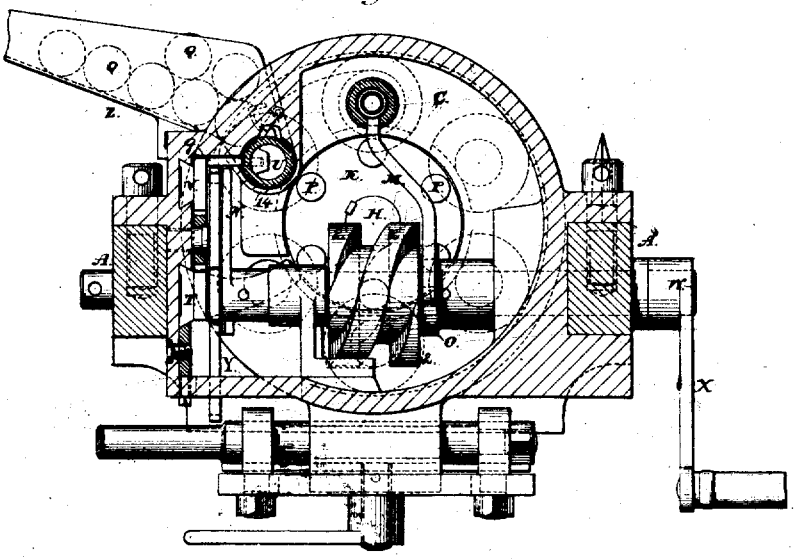
Figure 5:
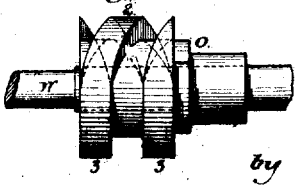

Figure 1 is a side elevation of the entire construction, with the exception of the carriage on which it is mounted. The latter may be understood to be of any ordinary or suitable construction adapted to support it properly, and provide for its efficient and rapid transportation and manipulation. Fig. 2 is a cross-section. Fig. 3 is a central longitudinal section through the breech portion alone. It will be understood that this is one and one half times as large a scale as Figs. 1 and 2. Fig. 4 is a cross-section through the breech part, viewed from the rear. Fig. 5 represents a portion of the shaft carrying the worm-thread. Fig. 6 is a cross-section of the breech part, viewed from the front. Fig. 7 is a longitudinal section of a portion of the breech part. This is not a central section, but is taken somewhat beyond the center. It is in the plane of the axis of the farthest barrels; and Figs. 8 and 9 represent details detached. Fig. 8 is a view from the left side of the gun, representing one barrel and a portion of the mechanism for forcing in the cartridge. Fig. 9 is a plan view of the loading-bolt or charger, with the cartridge-controlling gate above it. All these figures, from 4 to 9, inclusive, are on the same scale as Fig. 3.

Similar letters of reference indicate like parts in all the figures.

A is a stout frame-work, turning on a center, E, and supports a yoke, D, at the front, and a massive breech-piece, C, firmly fixed thereto at the rear.

F G are stout disks or circular frames, which support the series of barrels B B, and hold them rigidly in position parallel to each other, and H is a stout axis, which supports the whole, and allows it to turn as required.

K is a wheel, firmly fixed on the rear extremity of the axis H, and P are stout pins extending rearward therefrom, and by means of which the axis, with its series of barrels, is turned and controlled by the mechanism now to be described.

The mechanism which turns the barrels, operates the loading and discharging mechanism, and also removes the shells of the cartridges after they are fired, is all contained within or attached to the stationary breech-piece C, which, it will be observed, is massive at its front face to receive and resist the concussions due to the successive explosions of the cartridges, but is hollow in its rear portion. Its extreme rear is closed by a removable piece, L, as represented. The cartridges are formed with flanged shells, of copper or analogous material, in the manner now extensively adopted in such cartridges, and provided with fulminate and provisions for igniting the same by a blow at the center, which needs no special description.

The front face of the stationary breech-piece C is cut away to provide a curved guideway, R. This guideway communicates with the front end of the loading-chamber, and is inclined so as to force the cartridge fully into the firing-chamber of the barrel as the barrel moves in its circular path to a position for discharging the cartridge. This construction shortens the throw of the yoke and enables a shorter crank-arm to be used, and consequently permits the breech of the gun to be reduced correspondingly in its dimensions. It moreover prevents any interference of the end of the plunger with the faces of the series of barrels, which, if in contact, might cause serious derangement of the parts.

The stationary breech-piece C, against the upper central face of which the cartridge is carried by the revolving series of barrels and supported at the moment of firing, is fitted with a steel face-plate, I, which is perforated to allow the protrusion of the firing-pin J to strike the cartridge. The firing-pin J is mounted in the stationary breech-piece C, and in a chamber formed, as represented, in the rear piece L, and is driven forward to strike a percussive blow by a coil-spring, S. The extreme rear of the chamber in which it is contained may be stopped by a removable plug, as represented in Fig. 3. An arm, M, extends downward and forward from the firing-pin J, and receives the action of the cam O, which moves it backward gradually, and allows it to move forward freely and smartly at the proper time under the action of the spring S. A transverse shaft, W, actuated by a crank, X, carries the cam O, which operates the arm M of the firing-pin, as above described. This shaft W also carries a peculiar worm-thread, which is partly helical and partly circumferential, as indicated by 2 and 3, which worm-thread performs an important office, as will hereinafter appear.

The shaft W and its attachments are shown in Fig. 5 in a position differing from the view in Fig. 4 by having one-quarter turn.

2 represents that portion of each thread which is spiral or helical, and 3 represents that portion which is simply circumferential, or standing in planes at right angles to the axis.

The effect of the worm-thread 2 3 is to turn the series of barrels B intermittingly, while the hand-crank X is turned steadily.

In operating the gun the hand of the attendant is applied to the hand-crank X, and the shaft W is turned steadily.

During about one half of its revolution it holds the barrels in a stationary position. During this period the loading of one barrel and the firing of another are effected. An exploded shell is also extracted from still another barrel. During the other half of the rotation of the shaft W the barrels B are rotated to bring new ones into position for each of these operations.

The mechanism for properly turning the series and discharging the barrels in succession will now be readily understood.

The mechanism for charging the barrels and removing the shells will now be explained.

A crank, N, fixed on the end of the shaft W, operates in the vertical slot of a yoke, Y, which is fast upon a slide, T, guided in a horizontal groove in the side of the chamber 13. The forward end of this slide T carries a hook, 1, and suitable mechanism for engaging the hook or hooks 1 over the flange of the cartridge at each extreme forward movement, and said slide T and the hook or hooks 1 constitute the cartridge-shell extractor. During one-half rotation of the shaft W the yoke Y, with its attachments, moves forward. In the extreme forward position the hook 1 engages with the shell of a previously-exploded cartridge, and during the return movement of the yoke Y and its attachments the shell is withdrawn and allowed to fall out through an aperture in the bottom of the stationary breech-piece C, leaving the hook 1 and its spring-catch or analogous device free to engage with the next shell on being again moved forward. The upper edge of the slide T is toothed, forming a rack, 4, which engages with the teeth 5 of a wheel, 6, which turns on a fixed pivot, 8, fixed in the side of the stationary breech-piece. These teeth 5 engage, in turn, with a rack, 7, on the under side of a slide, V, which is guided in a suitable groove in the side of the chamber 13, and carries an arm, 9, bearing against a loading-bolt or charger, U, and pushes forward the cartridge at the proper time.

The cartridges Q Q are laid in quantities in parallel positions in an inclined trough, Z, on the left side of the stationary breech-piece C, from which they pass through the feeding-recess into the loading-chamber in the stationary breech-piece. Their discharge is controlled by the mechanism, so that they are allowed to pass only one at a time down into the loading-chamber in the path of the charger or loading-bolt U.

At each partial rotation of the series of barrels B one barrel, in an empty condition, is brought in line with the path of the loading-bolt U, and one cartridge, Q, having been let down into the proper position in front of it, the forward movement of the loading-bolt U forces the cartridge into the firing-chamber of that barrel.

The cartridge, which has been thrust into the firing-chamber of the barrel and protrudes into the loading-chamber, is forced to its seat in the firing-chamber by the operation of the inclined guideway R, which it is forced to follow as the charged barrel is moved in its circular course into its position for firing.

It will now be understood that each semi-rotation of the crank N, by carrying the yoke Y forward, moves forward the hook or hooks 1, with the proper accompanying mechanism (not fully represented) for seizing an exploded shell, and also moves backward the loading-bolt U, and that the next semi-rotation of the crank N, by moving the yoke Y backward, withdraws the exploded shell, and by moving forward the loading-bolt U thrusts a fresh cartridge into its proper barrel above.

The yoke Y is cut away at 15, so that its surface describes a circular arc, of which the axis W is the center. The end of the constantly-revolving crank N will therefore, while traversing this surface of the yoke, impart no motion to the said yoke. In consequence of this lost motion of the mechanism which actuates both the loading-bolt or charger and the cartridge-shell extractor, the said loading-bolt will, by this construction, be held stationary, when fully retracted, for a period of time which will clear the loading-chamber and permit the perfect introduction of the cartridge therein. The cartridge-extractor at the end of its forward movement will also be held stationary for a period of time which will insure its hooks properly engaging with the rim of the cartridge-shell.

It is important that the cartridges Q be dropped one by one into the proper positions in front of the loading-bolt U, and that their movements shall be properly regulated, so as to insure that all the cartridges lie in a proper position. This is effected by the agency of a valve or controlling-gate, 10, which is hinged at the point 11, and extends along the whole width of the passage—or, in other words, corresponds, approximately, with the length of a cartridge.

This gate 10 is operated by the loading-bolt U as follows: The gate 10 is provided with an incline by being bent at its rear end, (see Figs. 8 and 9,) and when the loading-bolt U is drawn to the rear a projection, 12, formed thereon, comes under the rear inclined or bent-up end of the gate 10, and allows it to drop a little. This it is sure to do from its own gravity and that of the cartridges which rest upon it. This movement causes the cartridge resting thereon to fall suddenly, in a truly horizontal position, into the loading-chamber, upon the floor of which it rests in front of the loading-bolt U.

When the said bolt U moves forward, carrying the cartridge which rests upon the floor into the barrel, the projection 12 lifts the gate 10 sufficiently to raise and separate the mass of cartridges from the one deposited in the loading-chamber, and thus prevents them from falling during the period while the loading-bolt is forward. It thus sustains the mass of cartridges until the loading-bolt is again drawn quite to the rear, and when thus raised this gate forms, in connection with the loading-chamber, a closed guideway for directing the cartridge in its forward movement.

In the absence of this device, a cartridge, Q, might fall point first, instead of horizontally, into the loading-chamber, in which case the derangement of position would be liable to prevent the device from operating at all, and would be certain to cause delay in loading, which is not now necessary. Its operation is also such as to detach the lowermost cartridge from the one immediately surmounting it, especially detaching the flanges of the two, which sometimes become so engaged that the lowermost one will (unless separated) lock with and carry the next uppermost one forward with it.

In operating my invention one man places the cartridges Q in the feed-trough Z, while the second man turns the crank X. One half-turn of the latter brings one barrel, B, in line with the loading-bolt U. The second half-turn of the crank loads that barrel, and at the same time operates the firing-pin J on one cartridge and the extractor 1 on another.

The barrels remain stationary a sufficient length of time during each revolution of the crank Z to allow one barrel to be loaded, another to be fired, and the shell to be extracted from a third.

I claim as my invention—

1. In a machine-gun, the combination, with the reciprocating slide T, provided with the extractor 1, of the yoke Y, operating, substantially as described, for withdrawing the cartridge-shells from the barrels.

2. The slide V, carrying the charger or loading-bolt, in combination with the crank N, yoke Y, slide T, intermediate wheel 6, barrel or barrels B, and feed-trough Z, whereby the cartridges are successively inserted into and withdrawn from the barrels, as specified.

3. In a machine-gun, the partially-helical and partially-circumferential threads 2 3, in combination with the barrels B and shaft H, as specified, the shaft carrying said threads being placed at right angles to the barrels, and provided with suitable gear engaging with the threads 2 3, whereby the barrels are intermittingly rotated for successively receiving and discharging the cartridge, as set forth.

4. A cartridge-valve or controlling-gate combined with and operated by the loading-bolt or charger, substantially as described.

5. In combination with a loading-bolt or charger, a yoke and crank and intermediate connecting mechanism, substantially as described, for reciprocating the same.

6. The combination of the valve or controlling-gate with a loading-bolt or charger and the cartridge-loading chamber in the breech-piece, substantially as described.

7. The combination of the gate 10, having an incline or equivalent step near its rear end, with the loading-bolt or charger, substantially as described.

8. The combination, in the cartridge-loading chamber and feeding-recess communicating directly therewith, of a cartridge-controlling valve or gate, a reciprocating loading-plunger, and a support, as 14, for receiving the cartridge and guiding the same as it is carried forward into the firing-chamber, substantially as described.

9. A revolving mechanism for reciprocating the cartridge-loading bolt or charger, constructed substantially as described, whereby a lost motion is produced and the loading-bolt is held stationary during a portion of the revolution of the actuating-crank.

10. A revolving mechanism for reciprocating the cartridge-shell extractor, constructed substantially as described, whereby a lost motion is produced and the extractor is held stationary during a portion of the revolution of the actuating-crank.

11. The combination of the valve or controlling-gate with a stationary breech-piece provided with a cartridge-feeding recess and loading-chamber separate from the firing-chamber, substantially as described.

In testimony whereof I have hereunto signed my name in the presence of two subscribing witnesses.

B. B. HOTCHKISS.

Witnesses:
H. T. MUNSON,
M. B. PHILIPP.